Patented Mar. 1, 1932

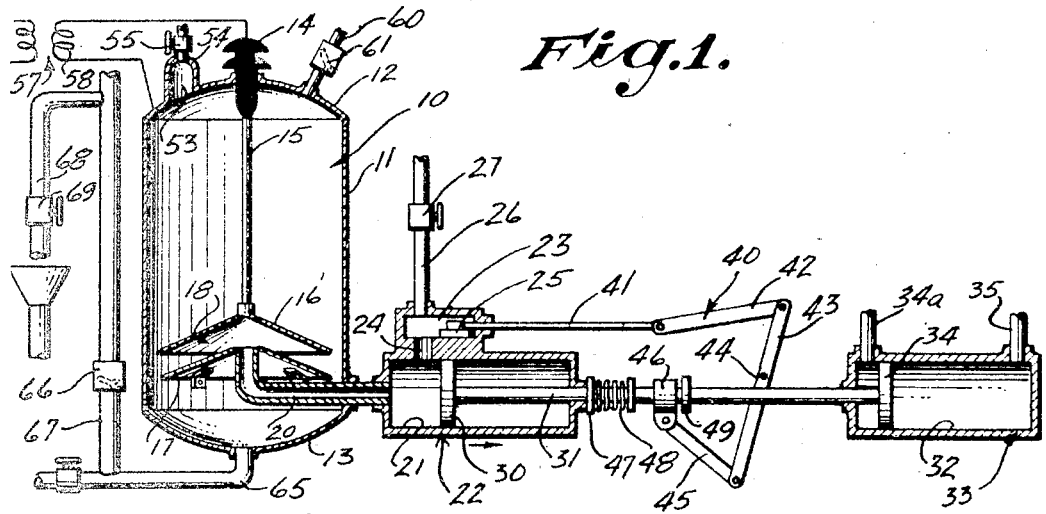
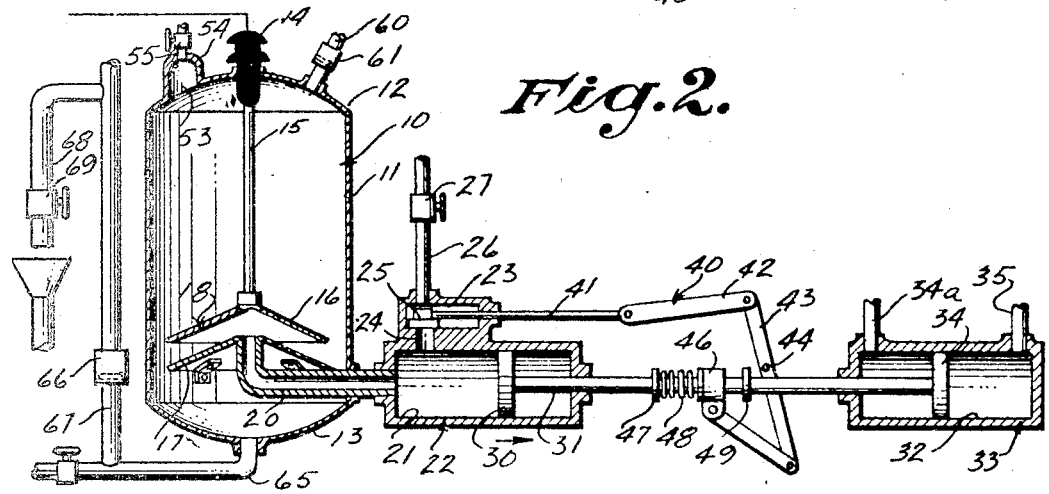
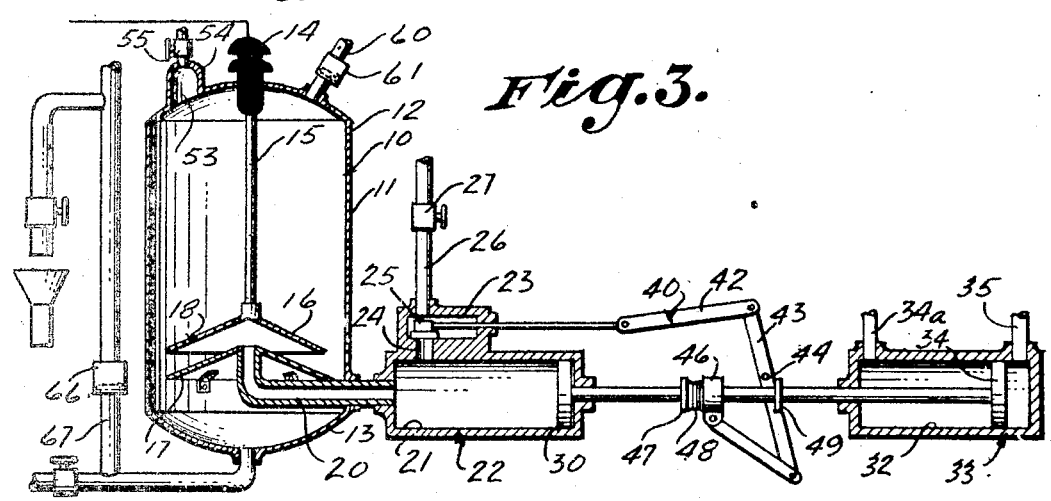

1,847,541

UNITED STATES PATENT OFFICE

WILLIAM F. VAN LOENEN, OF CASPER, WYOMING, ASSIGNOR TO PETROLEUM RECTIFYING COMPANY OF CALIFORNIA, OF LOS ANGELES, CALIFORNIA, A CORPORATION OF CALIFORNIA

TREATER WITH VARIABLE PRESSURE

Application filed May 7, 1929. Serial No. 361,194.

My invention relates to electric treaters, and more particularly to a novel method of dehydrating petroleum emulsion, and to a novel apparatus for performing this method.

One method at present in use of dehydrating petroleum emulsion is to pass this emulsion through an electric field of high voltage gradient, this field acting to coalesce the water particles into globules of sufficient size to gravitate from the oil. Treaters of this type are well-known and are usually operated at atmospheric pressure.

I have found it desirable to vary the pressure to which the emulsion is subjected during the electric treatment thereof, and it is an object of this invention to provide a method of treating emulsion wherein the pressure on the emulsion is changed during the electric treatment thereof.

It has previously been suggested that desirable results are obtained by electrically treating the emulsion, and holding this emulsion under high pressures. This method has, however, not been entirely successful when applied to certain types of emulsion.

I have discovered that successive changes in pressure during electric treatment of an emulsion produce a very desirable treating action. This is due, I believe, to two factors. In the first place, a change in pressure to which the emulsion is subjected apparently tends to break any short-circuiting chains which may be formed across the electric field due to coalesced water particles lining up. This is especially true in the treater of my invention wherein this change in pressure is accompanied by a small flow of emulsion in the treating space. In the second place, I lower the pressure substantially below atmospheric and subsequently again raise the pressure. Frequently the continuous or dispersed phases of an emulsion contain particles of gas, this situation occurring in petroleum emulsions wherein the emulsion particles forming the dispersed phase contain entrapped gas. When such an emulsion is under a partial vacuum, the entrapped gas in the emulsion particles expands rapidly, which causes an internal pressure at the emulsion interface and decreases the surface tension of the emulsion particles as the pressure decreases. This action is a very important one especially if the emulsion is at this time in an electric field, for the water particles are very rapidly agglomerated when subjected to varying amounts of vacuum. If the emulsion is subjected to an electric field during this decrease in pressure, a very rapid agglomeration of the water particles takes place. It is, however, possible that there are other theoretical considerations which bear directly upon the desirable results obtained, and my process is thus not limited to the above theoretical explanation of the results obtained.

It is an object of this invention to provide a novel treater for varying the pressure of an emulsion during electric treatment thereof.

A further object of this invention is to provide an electric treater wherein this pressure is varied by means of a reciprocating plunger which also supplies the emulsion to the treater.

Still a further object of this invention is to provide an electric treater in which the fluid to be treated is alternately supplied to and withdrawn from the treating space, more of the emulsion being supplied than withdrawn over a given period of time.

Further objects and advantages of this invention will be made evident hereinafter.

In the drawings I have illustrated one embodiment of my invention:

Fig. 1 illustrates the apparatus in a primary position.

Fig. 2 illustrates the same mechanism in a secondary position.

Fig. 3 illustrates the mechanism in a tertiary position.

Referring particularly to Fig. 1, my invention comprises a treater 10 having a tank 11 including a cover 12 and a bottom 13. Extending through the cover 12 is an insulator 14 from which a rod 15 extends, this rod carrying a live electrode 16 at the lower end thereof. Mounted in the tank 11 is a grounded electrode 17, there being a treating space 18 defined between the electrodes.

I have illustrated the electrodes 16 and 17 as being conical but the particular shape of these electrodes is not a part of this invention.

Communicating with the central portion of the treating space 18 is a fluid-conducting means in the form of a pipe 20 which extends downward through the walls of the tank 11 and communicates with a cylinder 21 formed in a cylinder structure 22. This cylinder structure includes a valve chamber 23 which communicates with the cylinder 21 through a passage 24 adapted to be closed by a valve 25. The valve chamber 23 communicates with a fluid-supply means 26 having a valve 27 for controlling the amount of fluid passing therethrough.

A piston 30 is adapted to slide in the cylinder 21, this piston being connected to a piston rod 31 which extends from the cylinder structure 22 and to the interior of a steam cylinder 32 of a steam engine 33, this rod having a piston 34 attached thereto and slidable in the steam cylinder 32. Pipes 34a and 35 are adapted to alternately supply steam to opposite sides of the piston 34, the flow of steam through these pipes being controlled by any suitable valve mechanism, not shown. The piston 34 acts as a reciprocating means for the piston 30, these pistons being interconnected by the piston rod 31.

The valve 25 is adapted to be actuated by a valve mechanism 40 of any desired type, this type being immaterial so long as the steps to be hereinafter outlined are substantially duplicated. The particular valve mechanism shown comprises a rod 41 secured to the valve 25 and pivoted to a link 42, this link being in turn pivoted to a rocker arm 43 which is pivoted at a fixed pivot 44. A link 45 connects the opposite end of the rocker arm 43 with a sleeve 46 which is slidable on the piston rod 31. A primary collar 47 is adjustably secured to the piston rod 31, and holds a spring 48 there adjacent, this spring surrounding the rod 31. A secondary collar 49 is adjustably secured to the rod 31, the sleeve 46 being positioned between the primary and secondary collars 47 and 49.

The piston 30 and valve mechanism 40 are cooperatively adapted to both supply the emulsion or other fluid to be treated to the interior of the tank 11 and to regulate the pressure to which this emulsion is subjected during the electric treatment thereof. The interior of the tank 11 is ordinarily substantially filled with fluid, and due to the fact that this fluid is substantially incompressible, it is advisable to provide a gas chamber 53 in communication with the interior of the tank, this chamber being formed by a dome 54 secured to the cover 12. A valve 55 may be utilized for controlling the amount of gas in the chamber 53, this valve permitting gas to be either withdrawn from the chamber 53 or supplied thereto.

If petroleum emulsion is to be dehydrated, this emulsion is supplied to the fluid-supply means 26, the flow thereof being controlled by the valve 27, this emulsion eventually reaching the treating space 18 wherein the water particles are agglomerated due to the action of the electric field formed therein. This field is set up by a transformer 57, the secondary 58 of which is connected to the rod 15 and to the tank 11. The dry oil, being lighter than the water, rises to the top of the tank and may pass therefrom through a primary outlet means 60 which is provided with a check valve 61 which closes to prevent any return flow of oil to the tank 11. This check valve may be of the flapper type and is preferably spring-operated so that the pressure tending to hold the valve closed may be readily varied. Such valves are well-known in the art and the details thereof are not a part of this invention. Similarly, a secondary outlet means 65 communicates with the lower end of the tank 11, this outlet means providing a check valve 66 of a type similar to the check valve 61, this valve allowing a ready passage of water from the tank 11, but preventing any return flow thereinto. The valve 66 is positioned in a pipe 67 which extends upward to a point adjacent the top of the treater 10, and is in communication with a discharge pipe 68 controlled by a valve 69 which is normally open.

The operation of my invention may best be understood by a successive reference to Figs. 1, 2, and 3. Referring particularly to Fig. 1, the piston 30 is shown in an advanced position, wherein the volume of the cylinder 21 is a minimum. The valve 25 is at this time in a retracted position, allowing a body of fluid to be drawn into the cylinder 21 as the piston 30 moves rightward. This flow of fluid is controlled by the degree to which the valve 27 is opened.

As the piston 30 moves rightward, the spring 48 comes into contact with the sleeve 46, and moves the valve mechanism 40 into a position shown in Fig. 2. At this time the piston 30 is in an intermediate position and is still being moved rightward under the action of the steam entering the left-end of the steam cylinder 32 and acting to move the piston 34 rightward. When the valve mechanism moves into the position shown in Fig. 2, the valve 25 closes the opening 24, thus preventing any further entrance of fluid through the fluid-supply means 26.

A further rightward movement of the piston 30 creates a partial vacuum on the interior of the tank 11, the gas in the chamber 53 expanding to permit this piston 30 to move rightward. The check valves 61 and 66 are at this time closed and prevent any entrance of oil or water therethrough. During this movement of the piston 30, the spring 48 is compressed, as best shown in Fig. 3, the valve 25 being retained across the opening 24. When the mechanism is in the position shown in Fig. 3, the pressure in the tank 11 is a minimum, this minimum being only a fraction of the original atmospheric pressure therein.

The flow of steam through the pipe 34a is at this time cut off, and steam is supplied to the pipe 35, thus moving the pistons 34 and 30 leftward. The first portion of this movement allows the spring 48 to expand to its normal length, and the sleeve 46 is not moved until the secondary collar 49 comes into contact therewith. Before this contact takes place, the pressure inside the tank 11 has been brought back to atmospheric, and has increased above atmospheric to an amount depending upon the setting of the check valves 61 and 66. Any further leftward movement of the piston 30 thus forces the separated phases of the emulsion through the primary and secondary outlet means 60 and 65.

Just before the piston 30 reaches the end of its stroke when thus moving leftward, the collar 49 comes into contact with the sleeve 46 and moves the valve mechanism into its position shown in Fig. 1 wherein the valve is withdrawn from its position closing the opening 24. The valve 27 acts to throttle any return flow of fluid through the fluid-supply means 26.

During this leftward movement of the piston 30, the fluid which entered the cylinder 21 during the rightward movement of the piston 30 is forced into the treating space 18 through the fluid-conducting means 20, this new fluid being treated as it passes through the field. A small reverse flow of treated emulsion takes place in the fluid-conducting means 20 when the piston 30 again moves rightward, but this flow is small due to the limited volume of the gas chamber 53 which allows a relatively quick change in pressure relative to the movement of the piston 30. The volume of this chamber must be a function of the change in volume in the cylinder 21 which takes place with a movement of the piston 30.

It will thus be seen that the pressure inside the tank 11 is alternately increased slightly above atmospheric and decreased substantially below atmospheric pressure. This change in pressure, as previously stated, effects a very quick separation of the phases of the emulsion, particularly to that portion which is under the influence of the electric field.

In its broadest concept my invention is not limited to the apparatus shown, but includes any means for successively increasing and decreasing the pressures in the tank 11, whether or not this means be a reciprocating one. Similarly, it is not necessary that the fluid-conducting means 20 communicate directly with the treating space 18 in the capacity shown, although I have found that this particular method of connection gives very desirable results and breaks any short-circuiting chains which tend to form across the treating space 18. This is especially true if the volume of the emulsion forced into the treating space during each stroke of the piston is substantially equal to the volume of this space.

Furthermore, it is not essential that the pressure in the tank 11 be raised substantially above atmospheric; however, I have found this increase in pressure above atmospheric pressure to be desirable, and have so designed the apparatus that this result is obtained. The amount this pressure increases above atmospheric is dependent, of course, on the setting of the check valves 61 and 66 though any desired pressure may be used.

The present application is an improvement on the method and apparatus disclosed in a co-pending application of H. C. Eddy, Serial 291,513, which discloses a process and apparatus for treating emulsion under a vacuum.

I claim as my invention:

1. A method of dehydrating an emulsion, which comprises: subjecting said emulsion to the action of an electric field; and intermittently changing the pressure to which said emulsion is subjected while in said field.

2. A method of dehydrating an emulsion, which comprises: intermittently reducing to a point below atmospheric pressure the pressure on said emulsion during electric treatment thereof.

3. A method of dehydrating an emulsion, which comprises: subjecting said emulsion to the action of an electric field; and successively changing the pressure to which said emulsion is subjected while in said field from above atmospheric pressure to below atmospheric pressure.

4. In an electric treater, the combination of: a tank adapted to contain a fluid to be treated; a pair of electrodes in said tank; means for setting up an electric field between said electrodes to which said fluid is subjected; and means for successively raising and lowering the pressure in said tank to values above and below atmospheric pressure.

5. In an electric treater, the combination of: a tank adapted to contain a fluid to be treated; a pair of electrodes in said tank; means for setting up an electric field between said electrodes to which said fluid is subjected; walls forming a gas-storage chamber communicating with said tank; and means for intermittently reducing the pressure in said tank to below atmospheric pressure.

6. In an electric treater, the combination of: a tank adapted to contain a fluid to be treated; a pair of electrodes in said tank; means for setting up an electric field between said electrodes to which said fluid is subjected; a cylinder; fluid-conducting means in open communication with the interior of said tank and with said cylinder; fluid-supply means for said cylinder; and a piston reciprocable in said cylinder for forcing fluid from said cylinder into and from said tank through said fluid-conducting means on successive strokes of said piston.

7. In an electric treater, the combination of: a tank adapted to contain a fluid to be treated; a pair of electrodes in said tank; means for setting up an electric field between said electrodes to which said fluid is subjected; fluid-conducting means communicating with the space between said electrodes; and means for successively forcing fluid into and from said tank through said fluid-conducting means; and check valve means for controlling the flow of said liquid from said tank and preventing any return flow thereinto.

8. In a treater, the combination of: a tank; means for successively raising and reducing the pressure in said tank; a pair of electrodes in said tank; primary and secondary outlet means for said tank; and a check valve in each of said outlet means to prevent any return flow into said tank when said pressure is lowered.

9. A method of separating the phases of an emulsion, one of these phases containing gas, which method includes the steps of: subjecting the emulsion to the action of an electric field; and intermittently expanding the gases in the gas-containing phase to decrease the surface tension of this phase.

10. A method of separating the continuous and dispersed phases of an emulsion, the dispersed phase of which contains entrapped gas, which method includes the step of intermittently expanding said entrapped gas in said dispersed phase while said emulsion is under the influence of an electric field.

11. In an electric treater, the combination of: a tank; means for setting up an electric field in said tank for treating a fluid therein; and means for successively reducing the pressure on the interior of said tank to values below atmospheric pressure during the treatment of said fluid by said electric field.

12. In an electric treater, the combination of: a tank; electrode means in said tank and defining a treating space; fluid-conducting means communicating with said treating space for supplying thereto the fluid to be treated; and means associated with said fluid-conducting means for reducing the pressure on the interior of said tank to a value below atmospheric pressure during the treatment of said fluid.

13. In an electric treater, the combination of: a tank; means defining a treating space in said tank; means for setting up an electric field in said treating space; fluid-conducting means for supplying fluid to be treated to the interior of said tank; a cylinder communicating with said fluid-conducting means; fluid-supply means communicating with said cylinder; a piston reciprocable in said cylinder; valve means in said fluid-supply means, said valve means being open throughout the first portion of the retracting movement of said piston and closed during the latter portion of this retracting movement and during a major portion of the succeeding advancing movement of said piston; and check valve means allowing escape of fluid from said tank but preventing the entrance of fluid therethrough into said tank.

14. In an electric treater, the combination of: a pair of spaced electrodes defining a treating space in which an electric field is established, said treating space providing an outlet; a fluid-conducting means communicating with said treating space; and means for successively forcing fluid into and from said treating space through said fluid-conducting means, said last named means forcing more of said fluid into said treating space than it removes therefrom, the excess flowing through said outlet.

In testimony whereof, I have hereunto set my hand at Casper, Wyoming, this 17th day of April, 1929.

WILLIAM F. VAN LOENEN.